Dec. 13, 1966    G. A. LE DELL    3,290,800
EDUCATIONAL GAME
Original Filed July 25, 1962
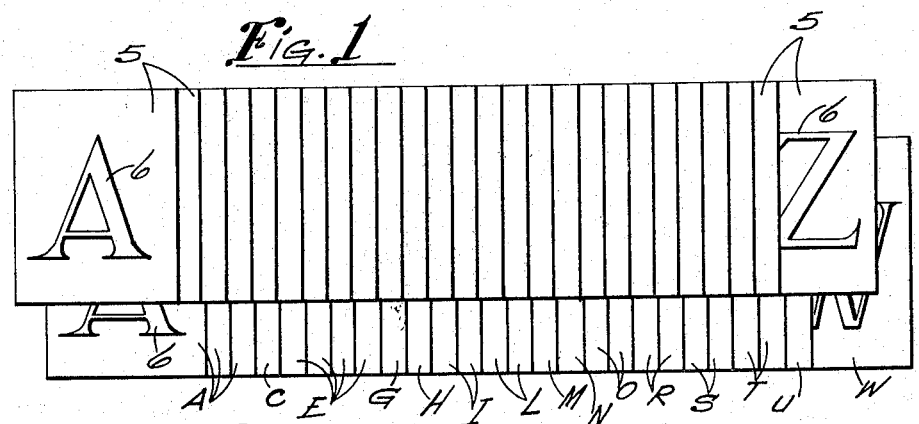
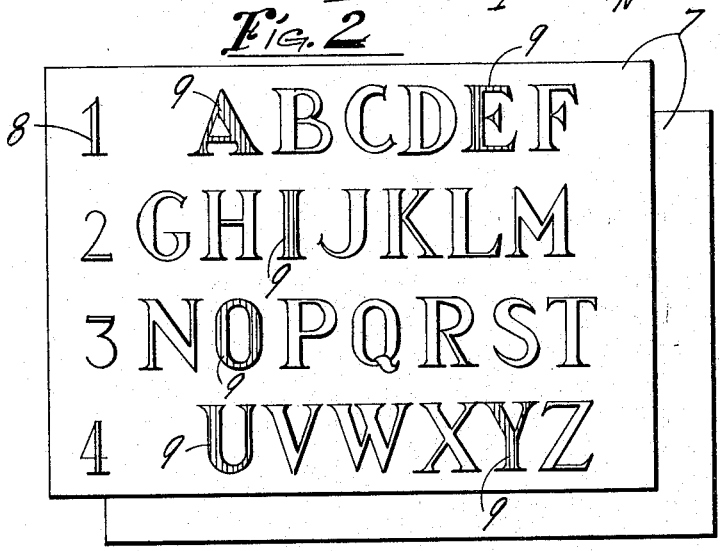
INVENTOR
GENEVIEVE A. LE DELL
ATTY.

United States Patent Office 3,290,800
Patented Dec. 13, 1966

3,290,800
EDUCATIONAL GAME
Genevieve A. Le Dell, 640 Bluff St., Beloit, Wis.
Continuation of application Ser. No. 212,391, July 25, 1962. This application June 10, 1964, Ser. No. 375,420
1 Claim. (Cl. 35—71)

This application is a continuation of my application, Serial No. 212,391, filed July 25, 1962, now abandoned.

This invention relates to an educational game designed to teach children the phonetic sounds, while incidentally teaching them the alphabet, spelling, and the art of word formation. The game is considered valuable for remedial teaching but is simple enough for general use and for playing in the home. Wherever it has been tried out with children in actual practice, the enthusiasm with which children have responded has been noteworthy and encouraging.

In the accompanying drawing, illustrating my invention:

FIG. 1 shows the deck of fifty-two playing cards that is preferably employed, namely one complete alphabet set, wherein each card bears one letter of the alphabet, plus twenty-six others, specially selected with word formation in mind;

FIG. 2 illustrates the two player cards, one for each of two players, each card bearing the alphabet with the vowel letters a, e, i, o, u and y appearing in red, or any other suitable distinguishing color, and FIGS. 3 and 4 show score cards, FIG. 4 showing a card marked with the results of a game, for purposes of better illustration.

The same reference numerals are applied to corresponding parts in these four views.

Referring to the drawing, the fifty-two playing cards are designated by the reference number 5, these having each one letter of the alphabet printed thereon, as indicated at 6, the letters being all displayed alike, as shown, and there being one complete alphabet represented, A to Z, plus three A's, an additional C, four E's, an additional G, an additional H, two I's, two L's, an additional M, an additional N, two O's, two R's, two S's, two T's, an additional U, and an additional W, the thought being that with additional vowels (except for additional Y's), and the other letters selected, word formations are more likely when a player gets five cards, as will hereinafter more clearly appear. Due to the letters in the lower row of cards 5 in FIG. 1 being all concealed, excepting for the A and W, the rest are indicated by the appropriate letters and lead lines, as shown. At 7 are indicated two identical player cards, one for each of two players, on each of which is printed in four rows, numbered at the front of each row, as indicated at 8, as 1, 2, 3 and 4, row 1 containing the letters A through F, row 2 the letters G through M, row 3 the letters N through T, and row 4 the letters U through Z, special attention being called to the printing in a contrasting color, like red for instance, of the letters A, E, I, O, U and Y, which are the vowels, as shown at 9. The other letters are usually printed in black, the same as the numerals 1 to 4, but the color or absence of it so far as they are concerned is not important, so long as the vowel letters stand out by any suitable contrasting coloring as just described. So much for the instrumentalities used in playing the game.

At 10 is shown a score card, these being preferably in the form of sheets and usually bound in a pad, so that one after another as used may be torn off the pad and discarded or otherwise disposed of. The arrangement of the information on these cards or sheets 10 is mostly a matter of convenience, there being spaces 11 for the names of the two contestants, spaces 12 for indicating the different hands played, and other spaces 13 for entering the scores per hand, together with spaces 14 for the totals of the number of "no" answers, and there below spaces 15 for entering the number of words formed, using five letters per player, that figure being subtracted from the number of no's to give the final score for each player, which is entered at 16.

In operation, the game is played as follows: The player cards 7 are placed in front of the two players and the cards 5 are shuffled, the first player cutting the cards in the manner common in the playing of other card games. The opponent takes the top card 5 from the stack after the cut, noting the letter and the row in which it appears on the alphabet card 7 before placing the card face down on the table so as to keep the identity thereof concealed from the player, who must try to guess the letter. The game, which can be supervised by the teacher or another adult or older child, who will keep the score with card 10, begins by the player asking "Is the card a vowel?" or "Is it a consonant?" The opponent answers yes or no in accordance with the fact, the scorekeeper scoring one mark for each no answer only against the player. Having once determined whether the letter on the card 5 played is a vowel or a consonant, the player now tries to determine the identity of the card by asking "Is it in row 1?" or "Is it in row 4?" and so forth, until the row is determined, the scorekeeper marking one mark as indicated on 17 in FIG. 4 for each no answer against the player. The next object is then to identify the letter specifically as by asking "It it B?" (assuming its location was found to be in row 1), or "Is it Q?" (assuming its location was found to be in row 3), and so forth, the player being cautioned, if necessary, to be careful to give the sound of each letter correctly as indicated below:

A as in am (vowel)
B as in baby
C as in cat
D as in day
E as in egg (vowel)
F as in fun
G as in go
H as in hat
I as in in (vowel)
J as in joke
K as in kitten
L as in lamb
M as in man
N as in now
O as in on (vowel)
P as in pony
Q as in quiet (kw)
R as in run
S as in sun
T as in time
U as in under (vowel)
V as in vase
W as in wind
X as in ax (cks)
Y as in yes (vowel sometimes)
Z as in zebra Once the player has identified the letter of the card, the opponent gives the card to the player, for subsequent reference. At the end of this sequence, before the situation of a player and opponent is reversed, the scorekeeper keeps track of the number of no answers by marking on the score card with a single line for each no, as at 17, and finally enters the total as indicated at 18 in FIG. 4. The opponent then goes through the same routine as previously described for the first player and the total number of no answers finally entered at 19 in FIG. 4 is determined as before by the number of lines marked for no answers at 20. Finally, after five hands, or any agreed number of hands, have been played in this way the totals are entered as at 21 in FIG. 4. Then the two players, using the cards 5 they have identified (five cards, if five hands have been played), try to form words using these cards in as many different relationships as they can find, and the total number of words formed by each player is entered, as at 22 in FIG. 4, and that number is deducted from the total entered at 21 to give the final score entered at 23. The player with the lower score is the winner of the game. Thus, in the example given in FIG. 4, the player named David scored less no's than the player named Jean but failed to form as many words using the five cards, and so the final total for David was higher than the final total for Jean, and Jean therefore won the game. If a child is too young to be expected to spell, this part of the game may be eliminated and in such a case a player with the least no answers is declared the winner.

If desired, at the end of each game, each player may be given the right to take an additional five (or more) cards off the top of the stack, so that both players have ten (or more) cards with which to form words. Otherwise, with only five cards, the possibilities of word formations are apt to be too limited.

Children benefit from the playing of this game not only in learning the phonetic sounds but also in learning the alphabet thoroughly, and learning spelling and word formation, the latter being very helpful in the playing of other games, such as Scrabble for example, and in working cross-word puzzles.

It is believed the foregoing description conveys a good understanding of the objects and advantages of my invention. The appended claim has been drawn to cover all legitimate modifications and adaptations.

I claim:

An educational game comprising, in combination, a pair of generally rectangular first cards of suitable dimensions having displayed on each all of the letters of the alphabet of one size suitable for easy reading of all letters, the letters being arranged in alphabetical order but separated into four spaced parallel rows, each row containing a plurality of letters and including at least one vowel and having an identifying caption number, the identifying caption numbers being in arithmetical succession, the vowel letters on said first cards being all displayed in one contrasting manner in relation to the consonant letters thereon all of which are displayed alike in another manner, and a deck of generally rectangular playing cards of suitable dimensions each of which bears a single letter of the alphabet, all of these letters being displayed alike, said deck of playing cards including at least one of each letter of the alphabet and being adapted to be shuffled so that the letters do not come in alphabetical order in the deck.

References Cited by the Examiner

UNITED STATES PATENTS

| D. 171,084 | 12/1953 | Corbett et al. | 35—71 X |
| 1,524,529 | 1/1925 | Allen | 273—146 |
| 1,686,237 | 10/1928 | Hoexter | 35—35 X |
| 2,445,421 | 7/1948 | Davis | 35—69 X |
| 2,891,322 | 6/1959 | Brownlee | 35—18 |
| 2,918,732 | 12/1959 | Ortega | 35—62 |

EUGENE R. CAPOZIO, *Primary Examiner.*

JEROME SCHNALL, *Examiner.*

H. S. SKOGQUIST, *Assistant Examiner.*